United States Patent [19]

Ohmura et al.

[11] Patent Number: 4,812,863
[45] Date of Patent: Mar. 14, 1989

[54] LENS-FITTED PHOTOGRAPHIC FILM PACKAGE

[75] Inventors: Hiroshi Ohmura, Tokyo; Seiji Asano, Saitama; Toshio Yoshida, Ibaragi, all of Japan

[73] Assignee: Fuji Photo Film Co., Ltd., Kanagawa, Japan

[21] Appl. No.: 158,139

[22] Filed: Feb. 17, 1988

[30] Foreign Application Priority Data

Feb. 17, 1987 [JP] Japan .............................. 62-21576[U]

[51] Int. Cl.⁴ ............................................. G03B 13/04
[52] U.S. Cl. .................................... 354/219; 354/288
[58] Field of Search .............. 354/219, 288, 202, 221, 354/222, 223

[56] References Cited

U.S. PATENT DOCUMENTS

| | | | |
|---|---|---|---|
| 3,731,586 | 5/1973 | Meazza | 354/219 |
| 4,742,366 | 5/1988 | Nakazawa | 354/219 |
| 4,751,536 | 6/1988 | Ohmura et al. | 354/288 |

FOREIGN PATENT DOCUMENTS 6708486  3/1968  Netherlands ..................... 354/288

Primary Examiner—A. A. Mathews
Attorney, Agent, or Firm—Young & Thompson

[57] ABSTRACT

A lens-fitted photographic film package having a light-tight film case in which a taking lens, an exposure member and a roll film, with their associated elements, all of which are previously encased therein, is provided with a direct-vision viewfinder comprising a finder frame opening formed in a rearwardly recessed part of a front wall of the light-tight film case and a viewing opening formed in a rear wall of the light-tight film case.

4 Claims, 2 Drawing Sheets

LENS-FITTED PHOTOGRAPHIC FILM PACKAGE

BACKGROUND OF THE INVENTION

The present invention relates to a lens-fitted photographic film package, and more particularly to a lens-fitted photographic film package in which a photographic film, a taking lens and an exposure member, with their associated elements, are incorporated in a light-tight film case as a unit.

A lens-fitted photographic film package now on the market provides many chances to enjoy oneself by conveniently taking pictures even with no camera. This lens-fitted photographic film package comprises, as an integral whole, a film case having a taking lens, a simple exposure mechanism which includes a film winding mechanism and a shutter mechanism with their associated elements incorporated in the film case, and a 110-size cartridge film or a film contained in a 35 mm-size film patrone previously packaged in the film case, which can be sold wherever photographic film is sold. This lens-fitted photographic film package can be sold at quite a low cost because there is no provision of a film loading back cover, a film rewinding mechanism, a complicated exposure control mechanism and so forth, and provides photographers with ease and enjoyment when taking pictures because there is no need to load and unload a film.

The lens-fitted photographic film package, after the exposure of all frames of the film, is forwarded to a photo shop or photo laboratory without removing the film. There, the exposed film in a film cartridge is removed by breaking open the film package and then developed to make print therefrom while the film package without film is scrapped. The prints together with the developed film are returned to the customer.

Such a photographic film package is generally provided with a direct-vision viewfinder without a finder lens. In this photographic film package, there are two somewhat conflicting requirements for such photographic film packages, namely, a wide field of view of the direct-vision viewfinder, and structural strength of the light-tight film casing. Specifically, it is desirable that the light-tight film casing have as small a size as possible and that, on the other hand, the direct-vision viewfinder have a field of view as wide as possible.

Such a direct-vision viewfinder has a relatively large viewing frame for a wide field of view. If the direct-vision viewfinder has to have a field of view substantially the same as, or at least 80% of the field of view of the normal focal length lens for the format in use, the viewing frame opening occupies a large proportion of the entire area of the front surface of the photographic film package. This proportion becomes increasingly large as the photographic film package is thicker or the front surface are of the photographic film package is smaller.

Therefore, a problem encountered in such a photographic film package is that the provision of a large proportion of the finder frame opening without a finder lens results in a constructionally weakened light-tight film case. Furthermore, a disproportionately large finder frame opening detracts from the appearance of the front of the photographic film package.

OBJECTS OF THE INVENTION

It is, therefore, an object of the present invention to provide a photographic film package which has a direct-vision viewfinder having a wide field of view.

It is another object of the present invention to provide a photographic film package which is strong and compact in construction although provided with a direct-vision viewfinder having a wide field of view.

SUMMARY OF THE INVENTION

To accomplish the above and other objects, the lens-fitted photographic film package according to the present invention comprises a light-tight film case having a taking lens, an exposure effecting means, a roll film previously encased ion the light-tight film case, and a direct-vision viewfinder with no finder lens. The light-tight film case is provided with a finder frame opening formed in its front wall and a viewing opening formed in its rear wall which together comprise the direct-vision viewfinder. The finder frame opening of the direct-vision viewfinder is formed in an inset part of the front wall of the light-tight film case.

According to a feature of a preferred embodiment of the present invention, the finder frame opening is formed in a part of the front wall of the light-tight film case which is recessed in one corner or inset in one side from top to bottom. Because the distance between the finder frame opening and the viewing frame opening is shorter than the ordinary thickness of the photographic film package, the finder frame opening can be smaller than that of a direct-vision viewfinder having the same field of view of which the finder frame opening is formed in an even flat front wall of the photographic film package. Thanks to the smaller finder frame opening, the light-tight film package will be stronger in construction.

BRIEF DESCRIPTION OF THE DRAWINGS

The above and other objects and features of the present invention will become apparent from the following detailed description taken in conjunction with preferred embodiments thereof with reference to the accompanying drawings in which like parts are designated by like numerals throughout the views of the drawings and wherein.

DETAILED DESCRIPTION OF THE INVENTION

The lens-fitted photographic film package according to preferred embodiments of the present invention incorporates several elements, in particular exposure elements and film advancing elements, similar to those of considerably simplified conventional still picture cameras. Because such elements are well known to those skilled in the art, this description will be directed in particular to elements forming part of, or cooperating directly with the lens-fitted photographic film package embodying the present invention. It is to be noted that, although the description will be directed to a lens-fitted photographic film package incorporating a 35 mm-size roll film, the film may take any of various forms well known to those skilled in the art and already commercially available. It is also to be noted that the lens-fitted photographic film package may be provided with a film rewinding mechanism by which a completely exposed film is rewound either manually or automatically.

Figure 1:
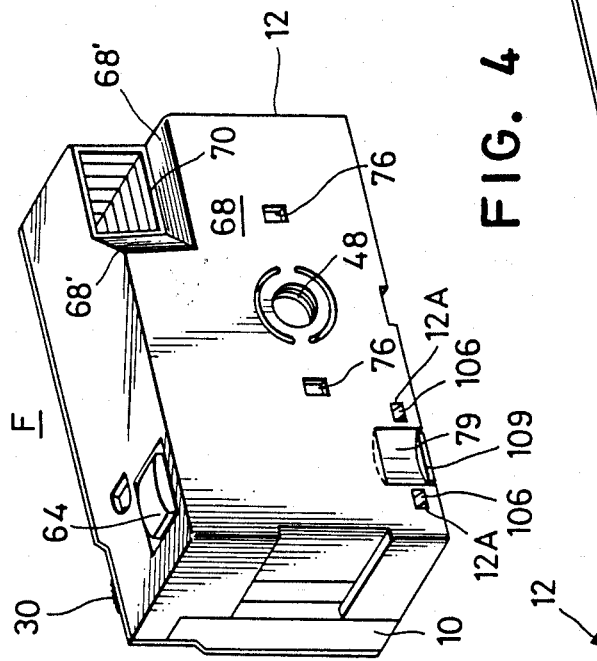
FIG. 1 is a perspective view of the lens-fitted photographic film package of a preferred embodiment of the present invention.
Figure 2:
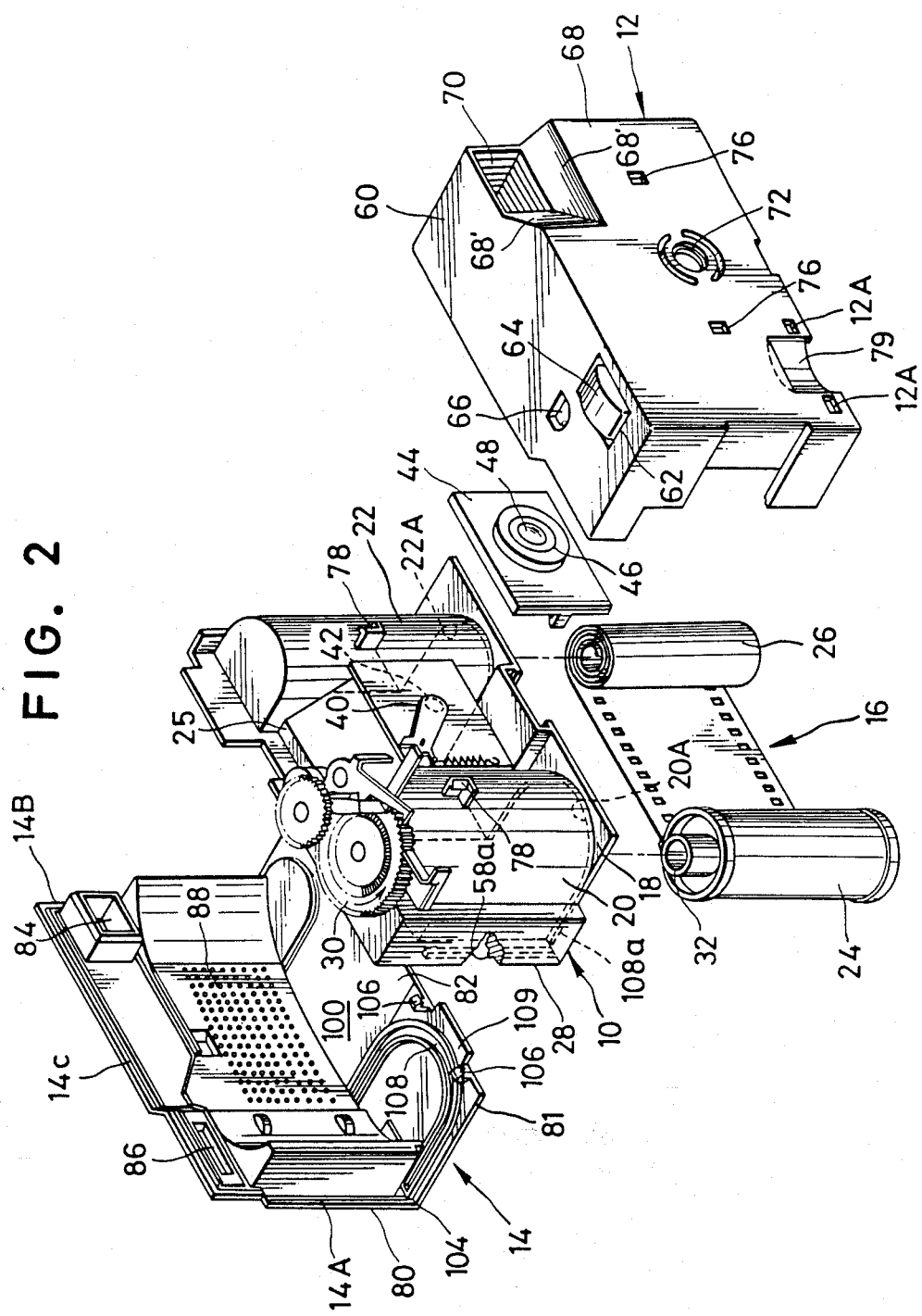
FIG. 2 is an exploded perspective view of the lens-fitted photographic film package of FIG. 1.

Referring now to FIGS. 1 and 2, shown therein is a preferred embodiment of the film package F in which a 135-size roll film 16 and a patrone 24 have been previously loaded. This film 16 is of the type having a 35 mm image frame which is defined as 135 film by the International Standardization Organization (ISO-code 1007: 1979 edition). The lens-fitted film package F comprises a middle case section 10, a front case section 12, and a rear case section 14 which are all made of plastic materials. These case sections 10, 12 and 14 are assembled to form a generally rectangular box-shaped film case. As will be described in detail later, these sections 10, 12 and 14 are light-tightly assembled after having loaded a film patrone 24 and a film roll 26 in the middle case section 10. Designated at 64 and 66 are a shutter actuating member projecting slightly from an opening 62 formed in the top of the front case section 12 and a window of an exposure counter.

As is shown in detail in FIG. 2, on a base plate 18 of the middle case section 10, there are formed a patrone receiving chamber 20 and a film roll receiving chamber 22 spaced apart a predetermined distance from each other. Each chamber 20, 22 is open at its bottom through an opening 20A, 22A through which the patrone 24 or the film roll 26 is inserted. Upon loading film 16, the film 16 is withdrawn from the film patrone 24 which is well known to those skilled in the art and already commercially available, and substantially all of the film withdrawn from the film patrone 24 forms a film roll 26 comprising a number of convolutions. Then the emptied film patrone 24 and the film roll 26 are loaded in the corresponding chambers 20 and 22 of the middle case section 10 through the openings 20A and 22A. This loading operation is done in a darkroom. It is to be noted that the film 26 may be withdrawn from the film patrone 24 after the loading of the film patrone 24 in the middle case section 10.

Between the film patrone receiving and film roll receiving chambers 20 and 22, there is a connecting section 25 in which an exposure frame is formed. Each case section 10, 12, 14, with its associated elements, is unitary. As is shown in FIG. 2, between the middle case section 10 and the front case section 12, there is a lens supporting board 44 in which an opening 46 is formed to hold a plastic lens 48 as the taking lens. The lens supporting board 44 is so placed as to align the plastic lens 48 with an exposure aperture 42 formed in the exposure frame.

Formed in the top wall 60 of the front case section 12 is a rectangular opening 62 which receives therein a shutter actuating member 64 with its top surface flush with, or projecting only slightly from, the outer surface of the top wall 60 of the front case section 12.

In the front wall 68 of the front case section 12, there is a recessed, that is, a rearwardly inset, part in the upper right hand corner as seen in FIG. 2, in which a rectangular finder frame opening 70 is formed. Formed also in the front wall 68 of the front case section 12 are a circular opening 72, and small square openings 76 and 12A. The opening 72 is formed coaxially with the optical axis of the lens 48. The finder frame opening 70 and the front wall 68 of the front case section 12 are connected by tapered walls 68' so as to prevent the field of view of the viewfinder from being reduced by the front wall 68.

The small openings 76 are so located as to receive hooked lugs 78 projecting from the middle case section 10 by which the two sections 10 and 12 ar temporarily secured together. The other small openings 12A are so located as to receive hooked lugs 106 projecting from a bottom cover section 81 of the bottom wall 100 as will be described later.

The rear case section 14, which has a generally L-shaped configuration, comprises a back wall 80 and a bottom wall 100. In the back wall 80 there is a viewing opening 84 in alignment with the finder frame opening 70 formed in the recessed part of the front wall 68 of the front case section 12 to provide a direct-vision viewfinder through which an object is viewed. There is also formed in the back wall 80 of the rear case section 14 a rectangular opening 86 which receives therein a film advancing knob 30 with its outer periphery flush with, or only slightly projecting from, the opening 86 formed in the back wall 80 of the back cover section 14. Inside the back wall 80 of the rear case section 14 is a raised portion 88 having a curved surface for supporting the film 16 thereon and guiding it therealong. The viewing opening 84 and the finder frame opening 70 which form the direct-vision viewfinder have a viewing axis parallel to the optical axis of the taking lens 48.

The bottom wall 100 of the rear case section 14 is so formed as to cover the bottom openings 20A and 22A of the film patrone receiving chamber 20 and the film roll receiving chamber 22 when the rear case section 14 is fitted to the middle case section 10. The bottom wall 100 is divided into two sections, namely, a bottom cover section 81 so formed as to cover the bottom opening 20A of the patrone receiving chamber 20 and a bottom wall section 82. The bottom cover section 81 is attached to the back wall 80 by means of a flexible hinge 104 so as to be capable of opening and closing the bottom opening 20A of the film patrone receiving chamber r20. The bottom cover section 81 is provided at its front edge with the pair of the hooked lugs 106 upwardly projecting therefrom which are brought into engagement with the small square recesses 12A formed in the front wall 68 of the front case section 12 when the photographic film package F is assembled, and with a jog portion 109 projecting forwardly therefrom which is received under a curved recess 79 formed in the front wall 68 of the front case section 12 when the hooked lugs 106 are engaged in the small holes 12A.

In the bottom cover section 81 there is also formed a groove 108 into which is fitted a semi-circular rail 108a formed on a lower end portion surrounding the bottom opening 20A of the patrone receiving chamber 20 to form a labyrinth seal when the photographic film package F is assembled. Owing to this labyrinth seal, the inside of the film patrone receiving chamber 20 is maintained light-tight. The rear case section 14 is formed with grooves 14A, 14B and 14C surrounding its outer periphery into which are fitted rails formed on rear surfaces of both side of the frame member 28 of the middle case section 10 and on a rear transverse end surface of the front case section 12 to form a labyrinth seal when the photographic film package F is assembled. Owing to this labyrinth seal, the inside of the photographic film package F can be maintained light-tight. Therefore, the film 16 received in the middle case section 10 is contained light-tightly when the middle, front and rear case sections 10, 12 and 14 are fitted together.

When assembling the film package F, the rear case section 14 is first fitted to the middle case section 10 in such a way as to place the bottom cover section 81 and the bottom wall 100 below the base plate 18 of the middle case section 10 so as to cover the openings 20A and 22A of the film patrone and film roll receiving chambers 20 and 22. At this time, the respective vertical grooves 14A and 14B of the rear case section 14 and the semi-circular groove 108 of the bottom cover section 81 receive the corresponding rails 58a and 108a of the middle case section 10. Due to the construction of the film package F, by fixing the rear case section 14 to the middle case section 10 in which the film patrone 24 and the film roll 26 have been previously loaded, the film 16 is contained light-tightly. Thereafter, the fixing of the front case section 12 is effected by fitting the rear edge of the front case section 12 into the transverse groove 14C of the rear case section 14 and, thereafter, by engaging the hooked lugs 78 of the middle case section 10 and the hooked lugs 106 of the bottom cover section 81 in the small square openings 76 and 12A formed in the front wall 68 of the front case section 12, respectively. Thereafter, the rear case section 14 is fixedly attached to the middle case section 10 along the right side vertical groove 14A and the left side vertical groove 14B of the rear case section 14 by ultrasonic welding.

Figure 3:
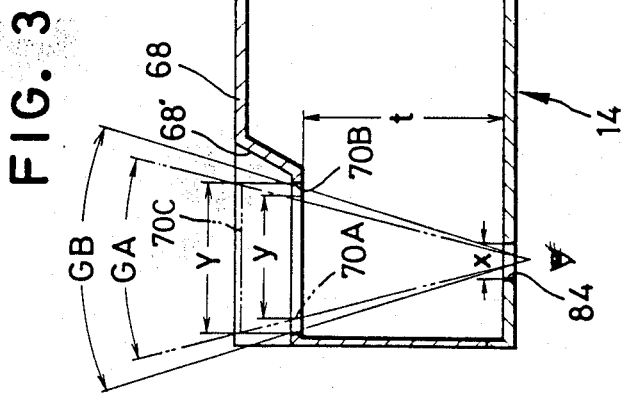
FIG. 3 is an explanatory illustration showing the field of view of the direct-vision viewfinder.

As will be understood from FIG. 3, according to the present invention, the field of view of the direct-vision viewfinder has either a smaller width of finder frame opening or a wider field of view of the viewfinder, than a conventional viewfinder. This will be easily understood by comparison with a conventional direct-vision viewfinder, indicated by phantom lines in FIG. 3, of which the finder frame opening 70C is formed in the plane of the front wall 68 and has a width Y and which has a field of view covering an angle GA. If the direct-vision viewfinder of the photographic film package of this invention is to have the same field of view covering the angle GA as that of the conventional direct-vision viewfinder, the finder frame opening 70A formed in the recessed part of the front wall 68 will have a width y which is smaller than that of the finder frame opening 70C of the conventional direct-vision viewfinder. On the other hand, if the direct-vision viewfinder of the photographic film package of this invention is to have the same width Y of finder frame opening 70B as the conventional direct-vision viewfinder, the direct-vision viewfinder of this invention can have a field of view covering an angle GB wider than that of the conventional one.

The width of the finder frame opening 70 is determined according to various design requirements. On the other hand, based on the determined width of the finder frame opening 70, the width x of the viewing opening 84 can be calculated by using the following formulas:

$$n \cdot \tan(18/f) = (x+y)/2t$$

therefore, $$x = 2n \tan(18/f) t - y$$

wherein n is the ratio of the width of the field of view of the direct-vision viewfinder to that of the taking lens, f is the focal length of the taking lens of the photographic film package, y is the width of the finder frame opening, and t is the distance between the finder frame opening and the viewing opening.

Upon placing an eye at the viewing opening and viewing the field through the viewfinder designed above, the field of view of the direct-vision viewfinder will be close to 100% of that calculated.

When using the film package F thus constructed, before making an exposure, by viewing the object to be photographed in the direct-vision viewfinder, the framing of the scene is effected. Thereafter, the shutter actuating member 64 is operated to open and close the shutter 40 for a time such so as to make a proper exposure for a frame of the film 16 disposed in the exposure position. After each exposure, the film advancing knob 30 is operated to rotate directly the spool 32 of the patrone 24 so as to wind up the film by one frame, namely an exposed part of the film, in the patrone 24. At the same time, another frame of the film 16 is advanced to the exposure frame 27. When a predetermined length of the film 16 is thus advanced, the film advancing mechanism and the shutter mechanism with its associated elements are self-cocked so as t complete the necessary operation of the film package F for another exposure.

As the exposure operation is repeated in the manner described above, the film 16 is wound up in the patrone 24 frame by frame. At the end of the exposure of all frames of the film 16, the film 16 is fully wound up in the patrone 24. After the exposure of all frames of the film 16, the film package F is forwarded to a photo shop without removing the exposed film. There, the patrone 24 is removed from the photographic film package F. For this removal of the film patrone 24, the jog portion 109 of the bottom cover section 81 is pulled in a direction to disengage the hooked lugs 106 from the small square recesses 12A formed in the front wall 68 of the front case section 12, either by hand or by use of a pulling tool to open the bottom cover section 81 of the bottom wall of the rear case section 14. As a result, an opening is formed in the bottom wall of the rear case section 14 to allow the patrone 24 to be easily removed longitudinally. After the removal of the patrone 24 containing the exposed film, the film package F is scrapped. The patrone 24 is handled in the same manner as conventional patrones to take out the exposed film in a darkroom; then the exposed film is subjected to necessary processes for development and printing.

Figure 4:
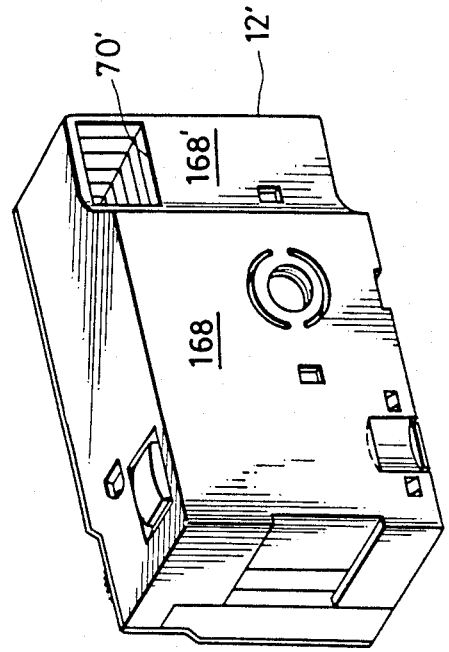
FIG. 4 is a perspective view of the lens-fitted photographic film package of another preferred embodiment of the present invention.

Referring to FIG. 4 showing the photographic film package of another preferred embodiment according to the present invention, a front case section 12' has its front wall 168 of which one side area 168' is, from top to bottom, recessed behind the surface of the front wall 168. In the recessed side area 168' a finder frame opening 70' is formed. The side area 168' recessed from top to bottom also has the advantage of snugly holding the photographic film package and preserving an attractive appearance of the photographic film package.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A lens-fitted photographic film package which comprises at least a taking lens, means for effecting an exposure, and a rolled film all of which are incorporated in a light-tight film case as a unit, said light-tight film case having a direct-vision viewfinder with no finder lens which consists of a viewing opening formed in a rear wall of said light-tight film case and a finder frame opening formed in a rearwardly recessed part of a front wall of said light-tight film casing.

2. A lens-fitted photographic film package as defined in claim 1, wherein said rearwardly recessed part is formed in only an upper corner of said front wall of said light-tight film case.

3. A lens-fitted photographic film package as defined in claim 1, wherein said rearwardly recessed part is formed in one side of said front wall of said light-tight film case from top to bottom thereof.

4. A lens-fitted photographic film package as defined in claim 1, wherein said viewing opening has a width x defined by the following equation:

$$x = 2n \tan(18/f) t - y$$

wherein
- n is the ratio of the field of view of said direct-vision viewfinder to that of said taking lens,
- f is the focal length of the taking lens,
- t is the distance between said finder frame opening and said viewing opening, and
- y is the width of sid finder frame opening.

* * * * *